US009274295B2

(12) United States Patent
Droesbeke

(10) Patent No.: US 9,274,295 B2
(45) Date of Patent: Mar. 1, 2016

(54) RELEASABLE CONNECTION FOR A TRANSCEIVER

(75) Inventor: Gert Droesbeke, Saint-Vit (FR)

(73) Assignee: FCI Asia PTE Ltd., Singapore (SG)

( * ) Notice: Subject to any disclaimer, the term of this patent is extended or adjusted under 35 U.S.C. 154(b) by 0 days.

(21) Appl. No.: 14/407,228

(22) PCT Filed: Jun. 12, 2012

(86) PCT No.: PCT/IB2012/001580
§ 371 (c)(1),
(2), (4) Date: Dec. 11, 2014

(87) PCT Pub. No.: WO2013/186584
PCT Pub. Date: Dec. 19, 2013

(65) Prior Publication Data
US 2015/0160423 A1      Jun. 11, 2015

(51) Int. Cl.
G02B 6/36      (2006.01)
G02B 6/42      (2006.01)
H01R 12/52    (2011.01)

(52) U.S. Cl.
CPC ............ *G02B 6/4284* (2013.01); *G02B 6/4201* (2013.01); *G02B 6/4246* (2013.01); *G02B 6/4261* (2013.01); *G02B 6/4292* (2013.01); *G02B 6/423* (2013.01); *G02B 6/426* (2013.01); *G02B 6/428* (2013.01); *G02B 6/4278* (2013.01); *H01R 12/52* (2013.01)

(58) Field of Classification Search
CPC ....... G02B 6/423; G02B 6/426; G02B 6/4261; G02B 6/4278; G02B 6/428; G02B 6/4284; G02B 6/4292
USPC ................................................ 385/88, 89, 92
See application file for complete search history.

(56) References Cited

U.S. PATENT DOCUMENTS

| 3,651,446 | A | 3/1972 | Sadogierski et al. ........ 339/91 R |
| 6,304,436 | B1 | 10/2001 | Branch et al. ................. 361/683 |
| 6,485,322 | B1 | 11/2002 | Branch et al. ................. 439/357 |
| 6,776,623 | B1 | 8/2004 | Yunker et al. ................... 439/71 |
| 7,013,088 | B1 | 3/2006 | Jiang et al. .................... 398/139 |
| 2007/0015416 | A1 | 1/2007 | Gutierrez et al. ............. 439/676 |
| 2011/0207344 | A1* | 8/2011 | McColloch ..................... 439/78 |
| 2011/0268397 | A1* | 11/2011 | Meadowcroft et al. ......... 385/94 |

FOREIGN PATENT DOCUMENTS

EP      2 428 828 A1    3/2012

* cited by examiner

*Primary Examiner* — Ryan Lepisto
(74) *Attorney, Agent, or Firm* — Harrington & Smith

(57) ABSTRACT

A connector with a transceiver and a socket on a substrate receiving the transceiver. The transceiver is movable within the socket into a locked position in a direction parallel to the substrate. The socket and transceiver include complementary locking sections cooperating when the transceiver is in the locked position. During the movement the transceiver wipes over contacts, e.g., on the substrate or on an interposer.

20 Claims, 5 Drawing Sheets

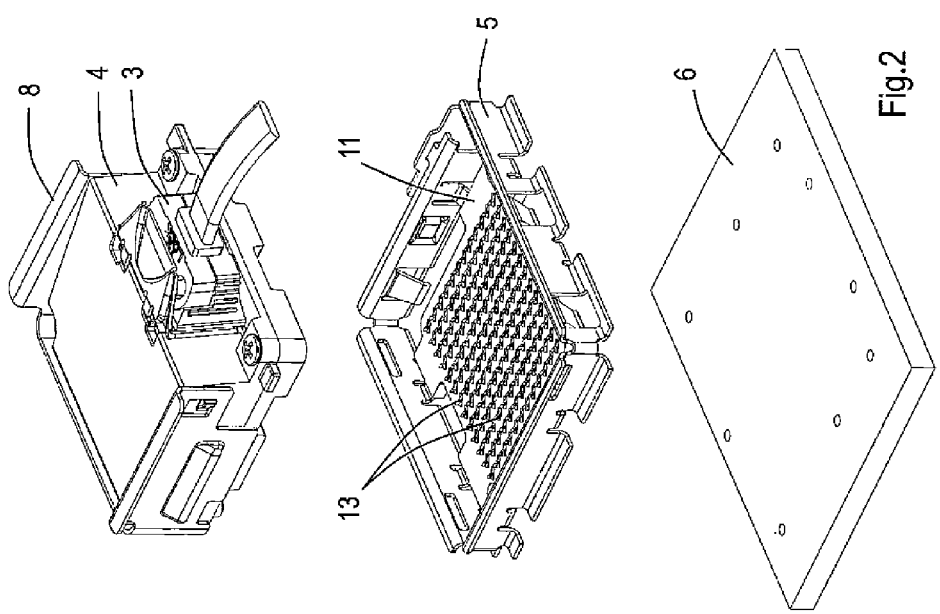

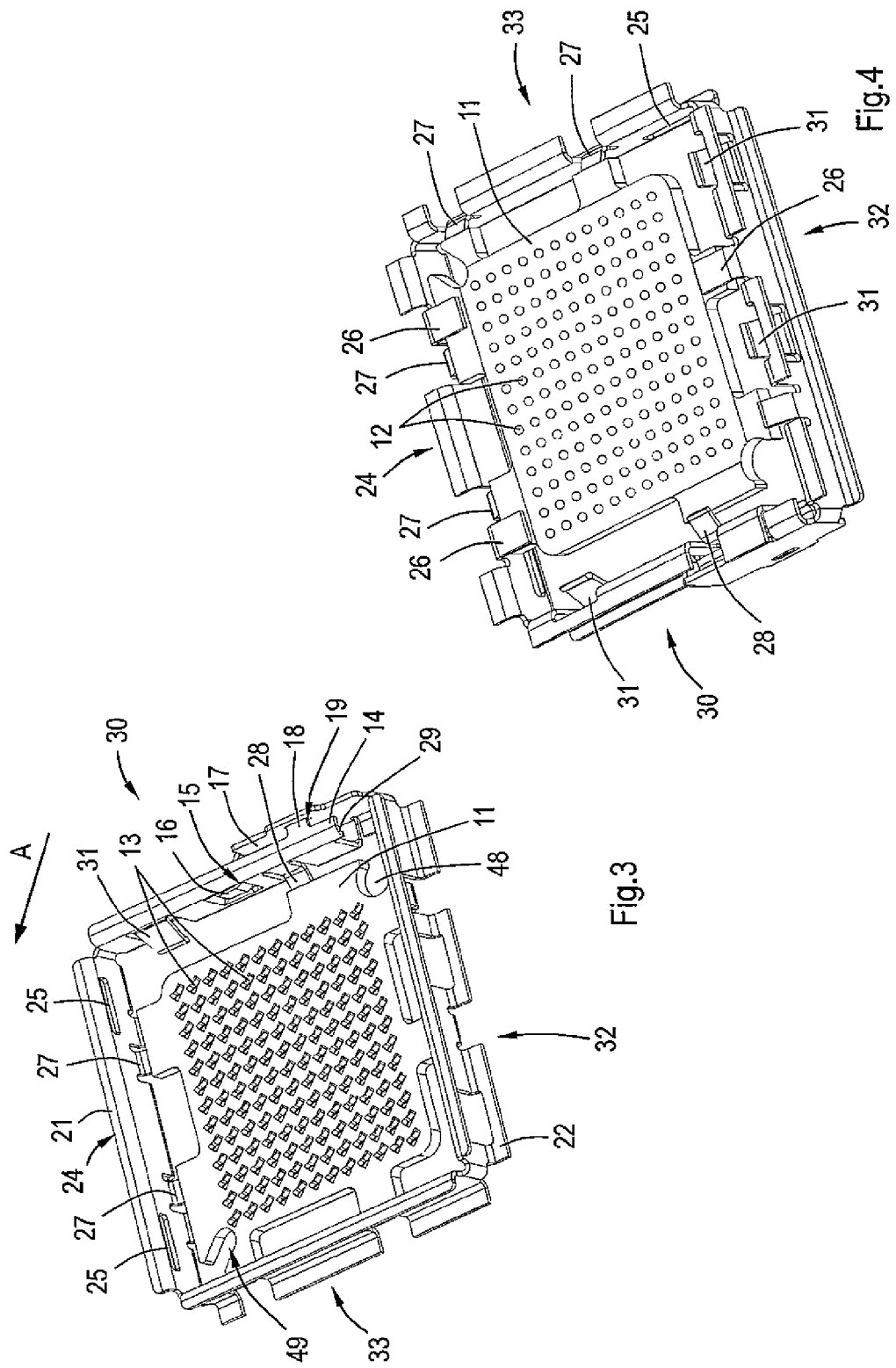

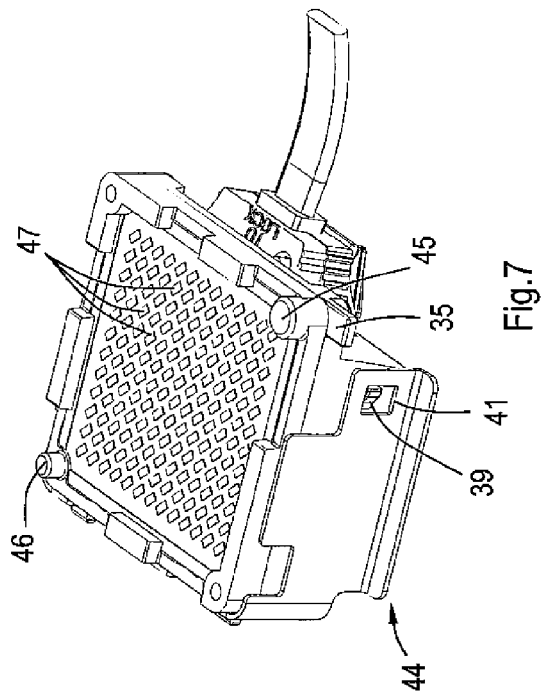
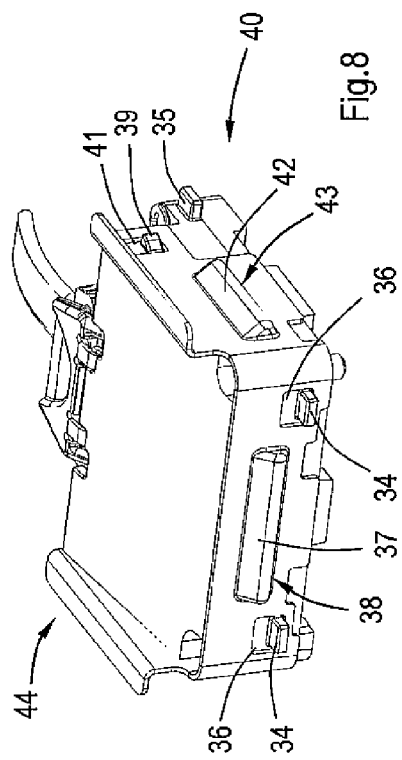
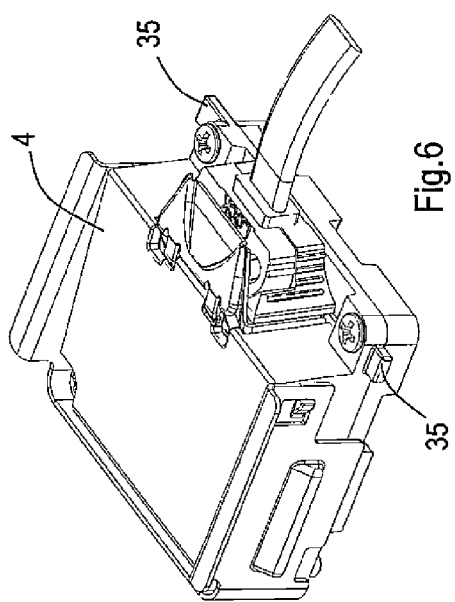

RELEASABLE CONNECTION FOR A TRANSCEIVER

FIELD OF THE DISCLOSURE

The invention relates to a connector comprising an assembly of a transceiver and a socket interconnecting the transceiver with circuitry on a substrate, such as a printed circuit board.

BACKGROUND OF THE DISCLOSURE

In optical communication systems optical fiber cables are typically coupled to an opto-electronic transceiver which is in turn coupled to a substrate, such as a circuit board. Such a transceiver typically includes a housing with opto-electronic elements, an array of contacts to be coupled to associated contacts on the substrate, and an optical contact unit configured to connect to a complementary optical cable connector.

Such transceivers can be coupled to a substrate by means of a socket holding the transceiver. In some cases the socket may comprise an interposer, which is a board with a lower side presenting an array of contacts, typically a ball grid array (BGA), to be connected to contacts on the substrate, and a top side similarly provided with an array of contacts, generally of a different type, to be connected to contacts at the lower side of the transceiver. To obtain high quality signal transfer, the contacts should be clean and the pressure on the contacts by the transceiver should be substantially equal for all contacts.

In the transceiver heat is generated which should be dissipated as much as possible in order to prevent failure. For that reason it is desirable to maximize outer surface area of the transceiver module.

The transceiver in such an LGA configuration should preferably be held in the socket in a releasable manner, e.g., to enable replacement of the transceiver in case of failure. To this end release mechanisms can be used, but such release mechanism typically require finger space for accessibility and actuation by a user. This limits the maximum number of sockets which could be placed per unit area. Moreover, the release mechanisms typically interrupt top and/or side faces of the board connector, thereby reducing heat dissipation surface.

It is an object of the invention to provide a system for connecting a transceiver to a socket reducing the risk of signal transfer failures due to contamination of the contacts or due to uneven contacting pressure. It is a further object to provide a releasable connection without requiring extra space for manual actuation. It is a further object to provide a release mechanism leaving a larger area for heat dissipation.

SUMMARY OF THE DISCLOSURE

A connector is disclosed with a transceiver and a socket on a substrate receiving the transceiver. The transceiver is movable within the socket into a locked position in a direction parallel to the substrate. The socket and the transceiver comprise complementary locking sections cooperating when the transceiver is in the locked position. The movement of the transceiver in the direction parallel to the substrate wipes the contacts of the substrate clean before the contacts of the substrate are positioned against respective contacts of the transceiver.

In a releasable embodiment, the transceiver is movable within the socket between the locked position and a release position in a direction parallel to the substrate. The connector can for instance have a release member for moving the transceiver to the release position against the action of resilient members biasing the transceiver to the locked position. Such a release member may for example comprise at least one wedge wedging between a wall of the socket and a surface of the transceiver to exert a force against the action of the resilient members, when the wedge of the release member is pushed down. Such a release member does not need to interrupt the top face of the transceiver. Consequently, the complete top face can be used for heat dissipation, for instance by means of a heat sink. If a heat sink is used with relatively high pins or fins, a pressure tool can be used gripping over the pins or fins to press the release member.

In specific embodiment the socket comprises an interposer having a lower side with contact pads connected to circuitry of the substrate, and a top side provided with an array of resilient contacts exerting an upward contact force. Suitable examples of such resilient contacts include land grid array (LGA) contacts. Such LGA contacts are resilient contact fingers, typically extending in the same direction. If LGA contacts are used, the direction of movement of the transceiver to the locked position may preferably coincide with the direction of the LGA contacts.

In an alternative embodiment, no interposer is used. Also in that case, the substrate can be provided with an array of resilient contacts exerting an upward contact force, such as LGA contacts.

If an interposer is used, the socket may for instance comprise inwardly bent support lips spacing the interposer from the substrate. For accurate positioning of the interposer, the socket may comprise inwardly extending positioners and fingers resiliently engaging side edges of the interposer to position the interposer against the positioners.

The resilient members biasing the transceiver to the locking position can for example be formed by inwardly bent leaf springs at a distance above the interposer. The leaf springs can form part of the socket. In a specific embodiment, the socket is a single stamped metal sheet strip bent to connect its outer ends. In that case the support lips, leaf springs, positioners and/or resilient fingers can be formed by inwardly bent parts of the strip.

To guide the transceiver in its movement to the locked position, the socket and the transceiver can for example be provided with complementary sliding guides defining the direction of that movement. If the socket comprises an interposer, the sliding guides can be formed by two recesses in the interposer receiving complementary projections of the transceiver. If the socket does not comprise an interposer, the guiding provisions can be formed by other parts of the socket.

The connector can for example be an optical board connector or an electrical connector.

BRIEF DESCRIPTION OF THE DRAWINGS

The invention will be further explained under reference to the accompanying drawings.

FIG. 2: shows the assembly of FIG. 1 in exploded view;

FIG. 3: shows the top side of a socket with an interposer of the assembly of FIG. 1;

FIG. 4: shows the lower side of a socket with an interposer of the assembly of FIG. 1;

FIG. 6: shows the transceiver of the assembly of FIG. 1;

FIG. 7: shows the lower side of the transceiver of FIG. 6;

FIG. 8: shows the transceiver of FIG. 6 from a different viewpoint.

DETAILED DESCRIPTION OF EMBODIMENTS

Figure 1:
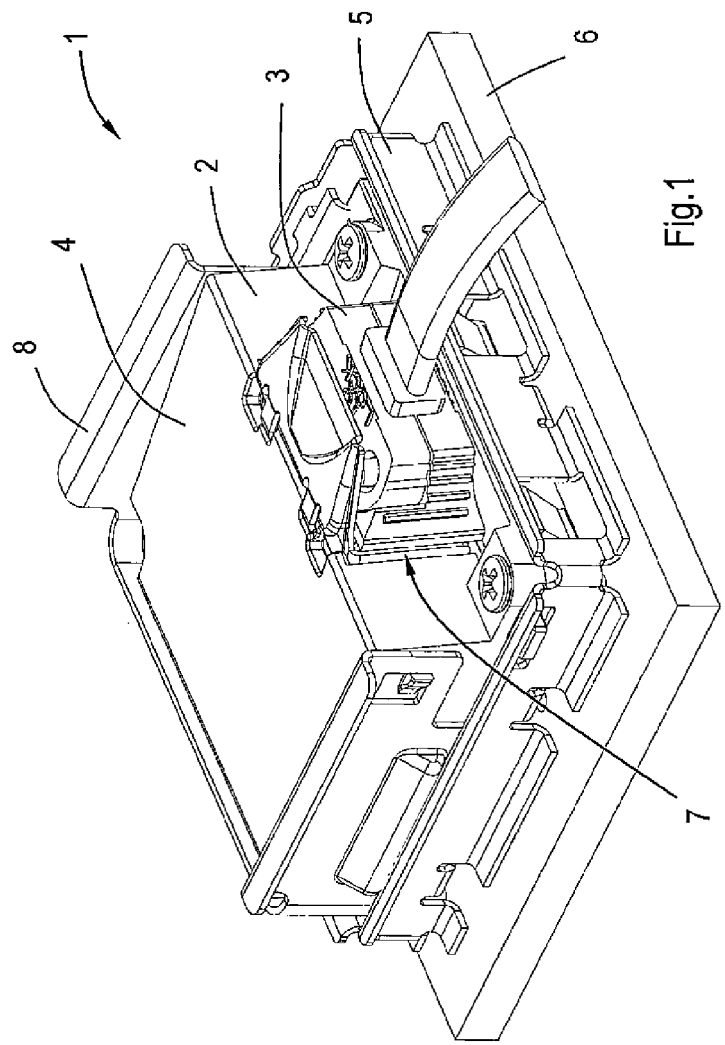
FIG. 1: shows an exemplary embodiment of an optical on-board connector assembly.

FIG. 1 shows a connector assembly 1 comprising an on-board connector 2 and a complementary optical cable connector 3. The on-board connector 2 comprises a transceiver 4 and a socket 5, which is positioned on a printed circuit board 6 and which holds the transceiver 4 in place. The transceiver 4 has a receiving opening 7 for receiving the optical cable connector 3. The transceiver 4 is provided with a release member 8 having a U-shape covering three sides of the transceiver 4.

The socket 5 holds an interposer 11 which is a board with contacts 12, 13 at both sides (see FIGS. 3 and 4). The lower side of the interposer 11, shown in FIG. 4, comprises an array of solder contacts 12, in this case ball grid array (BGA) contacts for connection to circuitry of the printed circuit board 6. On the top side (see FIGS. 2 and 3) the interposer 11 is provided with land grid array (LGA) contacts 13. The LGA contacts 13 are parallel resilient contact arms extending in a direction (arrow A in FIG. 3) parallel to a diagonal axis of the interposer 11.

The socket 5 is made of a stamped sheet metal strip bent to a closed rectangular or square outline. Near one end 14 of the strip an opening 15 receives a narrow extension 16 of the opposite end 17 of the strip. The first end 14 is also provided with two opposite lips 18 received in matching openings 19 of the opposite end 17. The four sides of the socket 5 have outwardly bent upper edges 21 and outwardly bent lower edges 22 mounted on the printed circuit board 6.

A first side 24 of the socket 5 is provided with two locking openings 25 near the upper edge 21 for locking the transceiver 4, as will be explained hereafter. Just below the openings 25 the first side 24 comprises two inwardly bent support lips 26 for supporting the interposer 11. Between the two support lips 26, the first side 24 comprises rigid positioners 27 abutting the side edge of the interposer 11 when it rests on the support lips 26. The next side 30 in clockwise direction is the side with the connected ends 14, 17 of the strip forming the socket 5 at one end of the second side 30. At the opposite end the second side 30 comprises an inwardly bent leaf spring 31 at a level above the interposer 11. A resilient finger 28 for accurately positioning the interposer 11 against the positioners 27 is located at the second side 30 between the opening 15 and the lips 18.

Near the resilient finger 28 the outer end 14 of the strip is extended with a lip 29 confining a recess for locking a complementary tooth 35 on the transceiver 5, as explained hereinafter.

Figure 5:
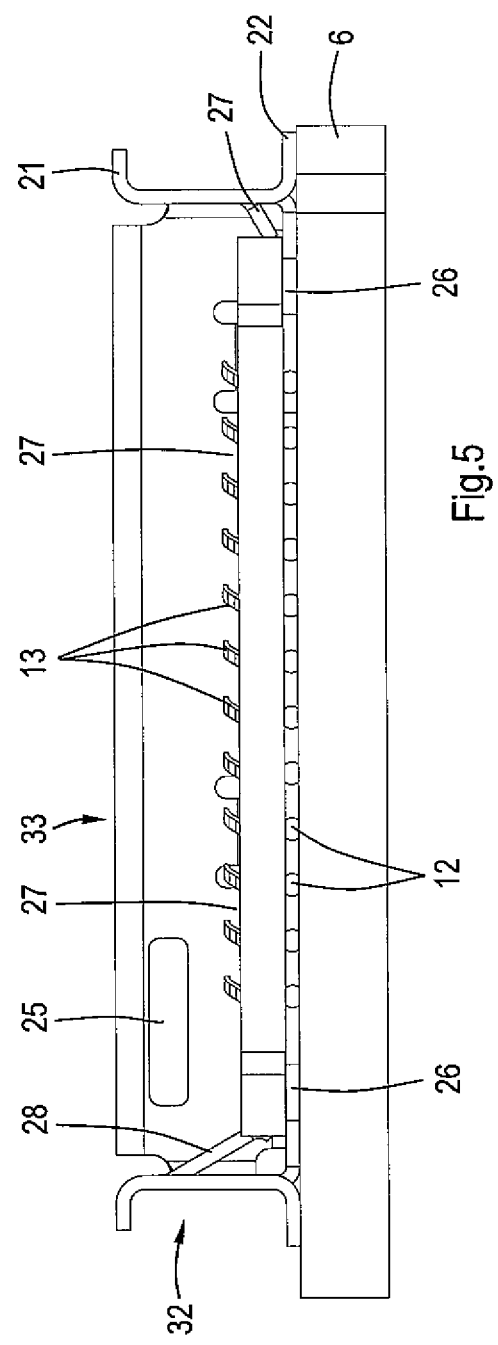
FIG. 5: shows the socket with interposer of FIGS. 3 and 4 in cross-section.

The next side 32 in clockwise direction comprises a single support lip 26, a single resilient finger 28 and two leaf springs 31 (see FIG. 4). Finally, the fourth side 33 comprises two positioners 27 and a locking opening 25 for locking the transceiver 4 (FIG. 5). The locking opening 25 is positioned near the corner with the third side 32.

Accordingly, the interposer 11 rests on three support lips 26: two at the first side 24 and one at the opposite third side 32. The support lips 26 space the interposer 11 from the circuit board 6. The interposer is pressed against the four positioners 27 by the two resilient fingers 28 resulting in a very accurate positioning. Other numbers of resilient fingers or positioners can also be used, if so desired. The socket 5 comprises three inwardly bent leaf springs 31. These do not engage the interposer 11, but serve to bias the transceiver 4 into the locking position, as will be explained hereinafter.

As shown in FIG. 8 the backside of the transceiver 4 has two teeth 34. Laterally extending teeth 35 are held at the sides of the transceiver 4 near the corners with the cable entry side. The teeth 34 at the back side and the laterally extending tooth 35 at the left side of the cable entry are spaced and dimensioned to fit into the openings 25 in the socket 5 when the transceiver 4 is in the locked position. Similarly, the laterally extending tooth 35 at the right side of the cable entry is dimensioned to fit below the lip 29 at the outer end 14 of the strip forming the socket 5 when the transceiver 4 is in the locked position.

The release member 8 covers three sides of the transceiver 4, leaving the cable entry side with the receiving opening 7 free. The back side of the release member 8 has two openings 36 receiving the teeth 35 in such a way that the teeth 35 can move up and down within the openings 36. The backside of the release member also comprises a wedge 37 extending between the two openings 36. The wedge 37 runs parallel to the upper and lower edges of the backside of the release member 8 and has a slanting lower wedge surface 38. The laterally extending teeth 35 of the transceiver 4 are not covered by the release member 8. At the side faces the transceiver 4 comprises a cam 39 cooperating with a matching opening 41 in the release member 8 to hold the release member 8 in place relative to the transceiver 4. The opening 41 is dimensioned to allow vertical movement of the cam 39. At one side face 40 the release member 8 is provided with a second wedge 42 with a sloping lower wedge surface 43. The opposite side face 44 of the release member 8 does not have a wedge (see FIG. 7). This side face 44 is flat, but does have an opening 41 receiving a vertically movable cam 39 symmetrically arranged relative to the cam 39 and opening 41 of the other side face 40 of the release member 8.

As shown in FIG. 7, the lower side of the transceiver 4 comprises two differently sized alignment pegs 45, 46: a first peg 45 at the cable entry side near the flat side 44 of the release member 8 and a second peg 46 in the diagonally opposite corner. The first peg 45 has a larger diameter than the second peg 46. The lower side face of the transceiver 4 comprises an array of contacts 47 to be connected to the LGA contacts 13 of the interposer 11.

At one of its corners the interposer 11 comprises a first recess 48 positioned near the connected ends 14, 17 of the strip forming the socket 5 (see FIG. 3). The first recess 48 is dimensioned to receive the first peg 45 of the lower surface of the transceiver 4. A second recess 49 is provided at the diagonally opposite corner of the interposer 11. This second recess 49 is dimensioned to receive the second peg 46. The shortest line from the first recess 48 to the second recess 49 extends in a direction coinciding with the direction of the LGA-contacts, indicated by arrow A in FIG. 3.

When the transceiver 4 is pushed into the socket 5, the pegs 45, 46 will be received by the corresponding recesses 48, 49 in the interposer 11. The resilient leaf springs 31 bias the transceiver 4 in the direction of arrow A. During that movement, the transceiver wipes of the LGA contacts. This removes contaminations and contributes to an improved signal transfer. When the transceiver 4 is sufficiently pushed down against the resilient action of the LGA contacts 13, the leaf springs 31 will push the teeth 34, 35 in the corresponding openings 25 in the first and fourth sides 24, 33 of the socket 5, while the right side lateral tooth 35 is pushed below the lip 29. This fixates the transceiver 4 into the locking position. The openings 25 and the lip 29 are positioned in such a way that the pressure on the LGA contacts 13 exerted by the poisoned transceiver is substantially equal.

In the locked position the wedges 37, 42 rest on the upper edges of the socket 5. The parts of the three side faces of the release member 8 below the wedges 37, 42 are located between the walls of the socket 5 and the transceiver 4.

To release the transceiver 4 the release member 8 can be pushed down. The two wedges 37, 42 of the release member 8 push the transceiver in a direction opposite to the direction of Arrow A against the action of the resilient leaf springs 31 of the socket 5 towards a release position. This movement is guided via the pegs 45, 46 in the recesses 48, 49 of the interposer 11. In the release position the teeth 35 of the transceiver 4 are unhooked from the openings 25 in the socket 5. The transceiver 4 is pushed upwardly by the resilient LGA contacts 13, so the teeth 35 cannot re-enter the openings 25 in the socket 25.

The invention claimed is:

1. A connector with a transceiver and a socket on a substrate receiving the transceiver, the substrate having a top surface engageable with a facing surface of the transceiver, the transceiver being movable within the socket into a locked position in a direction parallel to the top surface of the substrate, the socket and transceiver comprising complementary locking sections cooperating when the transceiver is in the locked position.

2. A connector according to claim 1 wherein the transceiver is movable within the socket between the locked position and a release position in a direction parallel to the substrate.

3. A connector according to claim 2 comprising a release member for moving the transceiver to the release position against the action of resilient members biasing the transceiver to the locked position.

4. A connector according to claim 3 wherein the release member comprises at least one wedge wedging between a wall of the socket and a surface of the transceiver to exert a force against the action of the resilient members, when the wedge of the release member is pushed down.

5. A connector according to claim 1 wherein the socket comprises an interposer having a lower side with contact pads connected to circuitry of the substrate, and a top side provided with an array of resilient contacts exerting an upward contact force.

6. A connector according to claim 5 wherein the resilient contacts are land grid array (LGA) contacts.

7. A connector according to claim 5, wherein the socket comprises inwardly bent fingers spacing the interposer from the substrate.

8. A connector according to claim 5, wherein the socket comprises inwardly extending positioners and fingers resiliently engaging side edges of the interposer to position the interposer against the positioners.

9. A connector according to claim 5, wherein said resilient members biasing the transceiver to the locking position are inwardly bent leaf springs at a distance above the interposer.

10. A connector according to claim 1 wherein the socket and the transceiver are provided with complementary sliding guides defining the direction of movement to the locked position.

11. A connector according to claim 10 wherein the socket comprises an interposer provided with two recesses receiving complementary projections of the transceiver to form the sliding guides.

12. A connector according to claim 1 wherein the connector is an optical board connector.

13. A connector with a transceiver and a socket on a substrate receiving the transceiver, the transceiver being movable within the socket into a locked position in a direction parallel to the substrate, the socket and transceiver comprising complementary locking sections cooperating when the transceiver is in the locked position;
   further comprising a release member for moving the transceiver to a release position against the action of resilient members biasing the transceiver to the locked position; and
   wherein the transceiver is movable within the socket between the locked position and the release position in a direction parallel to the substrate;
   wherein the release member comprises at least one wedge wedging between a wall of the socket and a surface of the transceiver to exert a force against the action of the resilient members, when the wedge of the release member is pushed down.

14. A connector according to claim 13 wherein the socket comprises an interposer having a lower side with contact pads connected to circuitry of the substrate, and a top side provided with an array of resilient contacts exerting an upward contact force.

15. A connector according to claim 14 wherein the resilient contacts are land grid array (LGA) contacts.

16. A connector according to claim 13 wherein the socket and the transceiver are provided with complementary sliding guides defining the direction of movement to the locked position.

17. A connector according to claim 16 wherein the socket comprises an interposer provided with two recesses receiving complementary projections of the transceiver to form the sliding guides.

18. A connector with a transceiver and a socket on a substrate receiving the transceiver, the transceiver being movable within the socket into a locked position in a direction parallel to the substrate, the socket and transceiver comprising complementary locking sections cooperating when the transceiver is in the locked position;
   wherein the socket comprises an interposer having a lower side with contact pads connected to circuitry of the substrate, and a top side provided with an array of resilient contacts exerting an upward contact force; and
   wherein the socket comprises inwardly bent fingers spacing the interposer from the substrate.

19. A connector according to claim 18 wherein the socket comprises inwardly extending positioners and fingers resiliently engaging side edges of the interposer to position the interposer against, the positioners.

20. A connector according to claim 18 wherein said resilient members biasing the transceiver to the locking position are inwardly bent leaf springs at a distance above the interposer.

* * * * *